Feb. 5, 1974     F. N. SHAFFER     3,790,494

SILICA MODIFIED CALCIUM TUNGSTATE PHOSPHOR COMPOSITION

Filed Sept. 24, 1971

INVENTOR.
FRANCIS N. SHAFFER
BY Donald R. Castle
ATTORNEY 3,790,494
SILICA MODIFIED CALCIUM TUNGSTATE
PHOSPHOR COMPOSITION
Francis Nathan Shaffer, Tonawanda, Pa., assignor to
GTE Sylvania Incorporated
No Drawing. Continuation-in-part of abandoned application Ser. No. 30,461, Apr. 21, 1970. This application Sept. 24, 1971, Ser. No. 183,516
Int. Cl. C09k 1/28
U.S. Cl. 252—301.5          5 Claims

ABSTRACT OF THE DISCLOSURE

Silica-modified, lead-activated calcium tungstate phosphor compositions having a Ca:W ratio of substantially 1 and substantially all calcium and tungsten present as calcium tungstate are disclosed wherein the phosphor contains, as a modifier, silicon dioxide in an amount sufficient to produce increased brightness to about 0.03 mole per mole of calcium tungstate and as an activator, lead in an amount sufficient to produce luminescence to about 0.03 mole per mole of calcium tungstate.

CROSS-REFERENCE TO RELATED APPLICATION

This application is a continuation-in-part of S.N. 30,461 filed Apr. 21, 1970, and now abandoned.

BACKGROUND OF THE INVENTION

Field of the invention

This invention relates to phosphor compositions. More particularly it relates to lead-activated calcium tungstate phosphor compositions useful in fluorescent lamps.

Prior art

Lead-activated calcium tungstate phosphors have been used in certain fluorescent lamps as color correctors. In general, the lead-activated calcium tungstate phosphors emit in the blue region of the spectrum.

Certain properties of phosphor compositions are important in fluorescent lamp manufacture, such as the initial brightness of the emission, flowability, particle size and emission color.

In a lamp utilizing a phosphor, lamp coating weight and maintenance of the brightness are important characteristics.

It is believed, therefore, that a calcium tungstate phosphor composition that has improved initial brightness, has improved flow properties, has a smaller particle size and has satisfactory emission colors, would be an advancement in the art. It is further believed that a lamp utilizing the phosphor that has a lower lamp coating weight and improved maintenance would also be an advancement in the art.

SUMMARY OF THE INVENTION

In accordance with one aspect of this invention there is provided a luminescent phosphor composition consisting essentially of a silica-modified, lead-activated calcium tungstate having the formula: $XSiO_2 \cdot CaWO_4:YPb$ wherein the silicon dioxide content (X) is from an amount sufficient to produce increased brightness to about 0.03 mole per mole of calcium tungstate and the lead content (Y) is from an amount sufficient to produce luminescence to about 0.03 mole per mole of calcium tungstate and in the composition the Ca:W ratio is substantially 1, and substantially all the calcium and tungsten is present as calcium tungstate.

In accordance with an additional aspect of this invention, there is provided a process wherein an admixture of a suitable calcium source, a suitable tungsten source, a suitable lead source and extremely finely divided silicon dioxide having stoichiometric proportions of calcium source and tungsten source is formed and thereafter milled to a maximum particle size and then heated under controlled temperature conditions to produce the silica-modified, lead-activated calcium tungstate phosphors of this invention.

In accordance with another aspect of this invention, there is provided a fluorescent lamp comprising a pair of electrodes, a glass envelope disposed about the electrode, a fill of mercury disposed within the device and a coating of a silica-modified, lead-activated calcium tungstate luminescent phosphor composition having a Ca:W ratio of about 1 and having substantially all of the calcium and tungsten present as calcium tungstate.

Figure 1:
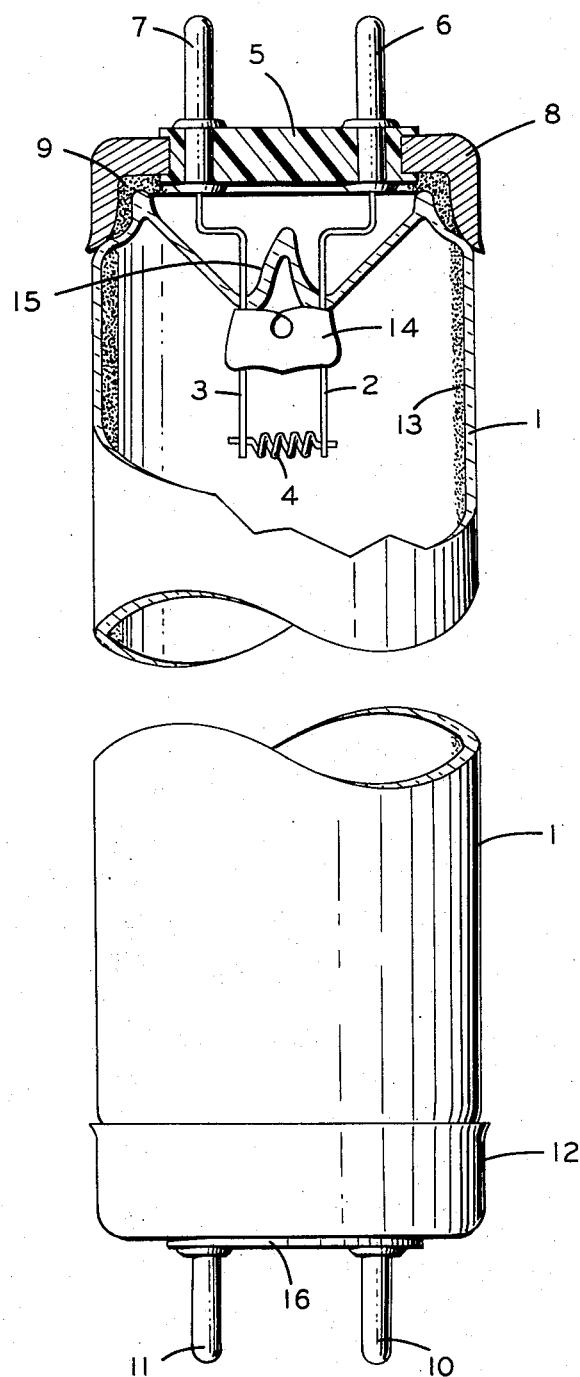
FIG. 1 is a fluorescent lamp of this invention.

For a better understanding of the present invention, together with other and further objects, advantages and capabilities thereof, reference is made to the following disclosure and appended claims in connection with the above-descriped drawing.

DETAILED DESCRIPTION OF THE DRAWING AND PREFERRED EMBODIMENTS

The principles of this invention are applicable to any type of fluorescent lamp and also to any type of device which utilizes a phosphor material such as a fluorescent sign or display device.

In FIG. 1, the sealed glass envelope 1 has the lead-in wires 2, 3 sealed through one of its ends and corresponding lead-in wires sealed through the other end. The usual coiled-coil 4 of tungsten wire is supported between, and electrically connected to, the pair of lead-in wires 2, 3 and a similar coil is supported by and connected to the lead-in wires at the other end of the envelope 1. An insulating base piece 5 having contact pins 6 and 7, each pin being connected to one of the lead-in wires, held in the metal cap 8 which is fixed by the cement 9 to one end of the envelope 1, and a similar base piece 16, having contact pins 10 and 11, is cemented to the other end by cup 12.

The tungsten coils carry the usual electron-emitting coating of alkaline earth oxides, generally including also a small percentage of zirconium dioxide.

A filling of argon gas at about 2 millimeters of mercury pressure, and the usual small quantity of mercury is inside the glass envelope 1. The lamp has the usual stem press 14 and sealed exhaust tube 15.

One the inside surface of the envelope, is a coating 13 of the phosphor of the invention, which in this embodiment is a silica-modified lead-activated calcium tungstate phosphor. It may be applied by the usual methods known in the art.

The silica-modified, lead-activated calcium tungstate phosphors have a Ca:W ratio of about 1 and substantially all of the calcium and tungsten present as calcium tungstate has a modifier up to about 0.03 mole of silicon dioxide per mole of calcium tungstate although from about 0.005 mole to about 0.015 mole of silicon dioxide per mole of calcium tungstate is preferred. Additionally, although amounts of lead as an activator up to about 0.03 gram atoms per gram mole of calcium tungstate can be used, it is preferred that from about 0.005 to about 0.02 gram-atoms of lead per gram-mole of calcium tungstate be used.

The novel phosphor compositions of this invention generally have a smaller average particle size than the previously known lead-activated calcium tungstate phosphors. For example, the average particle size of the prior art, lead-activated calcium tungstate phosphors, is about 4.0 to about 5.0 microns (Fisher Sub Sieve Sizer) whereas those of the present invention are less than about 4.0 microns and are generally within the range of from about 3.3 to about 3.7 microns. As a result, less phosphor can be used to produce a lamp of a constant lumens of light output.

It is also to be noted that in lead-activated calcium tungstate phosphors two distinct overlapping emission bands are present. A first band peaking at about 420 nm. is believed to result from $CaWO_4$ and a second band peaking at about 445 nm. is believed to be due to $CaWO_4$:Pb. In the present invention it has been found that lead content of the phosphors can be increased without an appreciable change in emission color from that of the prior art lead-activated calcium tungstate phosphors.

In the process of this invention any heat decomposable calcium source can be used. As used herein heat decomposable means a calcium source that will, upon the application of heat to achieve a temperature above about 1650° F., yield a source of calcium to react to form calcium tungstate. Similarly, heat decomposable tungsten sources are used. By heat decomposable tungsten sources it is meant that upon heating to a temperature of above about 1650° F. a source of $WO_3$ is formed that can react with the calcium to form the calcium tungstate host. Suitable calcium sources include calcium carbonate, calcium oxide, calcium acetate, calcium oxalate, calcium sulfate, calcium nitrate and the like. Of these, calcium carbonate is preferred. Suitable tungsten sources include tungstic oxide, tungstic acid and the like. Of these, tungstic oxide is preferred. It is also to be noted that the calcium and tungsten source form a phosphor having a Ca:W ratio of 1 therefore stoichiometric quantities of calcium and tungsten sources are used to produce a composition having essentially all the calcium and tungsten present as calcium tungstate. Excess amount of either calcium and tungsten in the phosphor yields detrimental properties which prevents the advantages of this invention from being achieved and can result in lamp maintenance problems, higher lamp coating weight and lower initial brightness.

The lead source can be any source of lead that will melt at a temperature below about 1650° F. such as lead dioxide, lead oxide, lead carbonate and the like. Of these, lead dioxide is preferred.

The silica source is an extremely finely divided silica having an average particle size less than about 140 angstroms. The small particle size also yield a large surface area generally above about 200 square meters per gram. A suitable silica is sold by Cabot Corporation, Boston, Massachusetts under the trade name of Cab-O-Sil M-5.

An admixture of the foregoing sources is prepared and is further subjected to suitable milling so that the resulting mixture is completely homogeneous. The mixture is thereafter heated at a temperature of from about 1650° F. to about 2000° F. under oxidizing conditions for a time sufficient to form the phosphor that has the foregoing improved properties.

One of the preferred preparation techniques is to heat the mixture for about 3 hours at a temperature of from about 1700° F. to about 1850° F. and thereafter cool the resultant mixture to atmospheric temperatures, screen the cooled material through a U.S. Sieve 50-mesh screen and heat for an additional 3 hours at a temperature of from about 1700° F. to about 1850° F.

It has also been found that a molar ratio of calcium source to tungsten source of about 1:1 yields improved results over that achieved with molar ratios deviating an appreciable amount from that ratio. Use of larger amounts of either calcium or tungsten such as ratios of 1:2 to 2:1 Ca to $WO_3$ can result in unsatisfactory phosphor compositions.

To further illustrate the invention, the following detailed examples are presented. All parts, proportions, percentages are by weight unless otherwise indicated.

EXAMPLE 1

About 350 parts calcium carbonate, about 812 parts tungstic oxide, about 9.5 parts lead dioxide, and about 3.5 parts extremely finely divided silicon dioxide are dry pebble milled for 1¾ hours and the milled material is then sifted through a U.S. Sieve 4-mesh screen. The material is fired in a covered crucible in an oxidizing atmosphere at a temperature of about 170° F., for a period of about 3 hours. After cooling to room temperature, the fired material is mortaed and sifted through a U.S. Sieve 50-mesh screen. The material is refired in a covered crucible in an oxidizing atmosphere at a temperature of about 1700° F., for a period of about 3 hours. After cooling to room temperature the refired material is mortared and sifted through a U.S. Sieve 50-mesh screen. The resultant luminescent material is more free flowing, has a smaller particle size and higher initial brightness than a similar material prepared without the addition of silicon dioxide, as illustrated in Table I.

TABLE I

| Sample No. (40 watt lamp) | $PbO_2$ Formulated/ 1 mole $WO_3$ | $SiO_2$ Formulated/ 1 mole $WO_3$ | Standard sub-sieve size | Initial brightness |
|---|---|---|---|---|
| 1 | 0.0057 | | 4.0 | 1,270 lumens (100%). |
| 2 | 0.0057 | 0.015 | 3.4 | 1,355 lumens (107%). |
| 3 | 0.0114 | | 4.6 | 1,242 lumens (98%). |
| 4 | 0.0114 | 0.005 | 3.7 | 1,453 lumens (114%). |
| 5 | 0.0114 | 0.015 | 3.3 | 1,423 lumens (112%). |
| 6 | 0.0229 | | 5.2 | 1,214 lumens (96%). |
| 7 | 0.0229 | 0.015 | 3.5 | 1,446 lumens (114%) |

From the above results, in each instance of the three levels of lead, the presence of silicon dioxide improved the initial brightness and decreased the particle size of the phosphor.

EXAMPLE 2

Example 1 is repeated using a one-step firing method at a temperature of about 1700° F. for a period of about 3 hours. Although the results were substantially the same, more reproducible results are obtained when a two-step firing method such as in Example 1 is employed.

EXAMPLE 3

A 40-watt lamp is made by standard procedures, using the material produced in Example 1. The resultant lamp has improved maintenance and lower powder weight coating than a similar lamp made with a luminescent material without the addition of silicon dioxide as illustrated in Table II.

TABLE II

| Sample No. (40 watt lamp) | $PbO_2$ Formulated/ 1 mole $WO_3$ | $SiO_2$ Formulated/ 1 mole $WO_3$ | Powder coating weight, gms. | Lamp brightness (100 hours) |
|---|---|---|---|---|
| 1 | 0.0057 | | 4.2 | 1,168 lumens (100%). |
| 2 | 0.0057 | 0.015 | 4.2 | 1,280 lumens (110%). |
| 3 | 0.0114 | | 4.8 | 1,133 lumens (97%). |
| 4 | 0.0114 | 0.005 | 4.3 | 1,301 lumens (112%). |
| 5 | 0.0114 | 0.005 | 4.1 | 1,301 lumens (112%). |
| 6 | 0.0229 | | 5.4 | 1,098 lumens (94%). |
| 7 | 0.0229 | 0.115 | 4.5 | 1,306 lumens (112%). |

From the above results, in each instance of the three levels of lead, the presence of silicon dioxide improved the lamp brightness after the 100-hour maintenance test and decreased the amount of powder coating weight necessary.

While there has been shown and described what is at present considered the preferred embodiment of the invention, it will be obvious to those skilled in the art that various changes and modifications may be made therein without departing from the scope of the invention as defined by the appended claims.

What is claimed is:

1. A luminescent phosphor composition consisting essentially of a silica-modified, lead-activated calcium tungstate having the formula $$XSiO_2 \cdot CaWO_4 : YPb$$

wherein X is from about 0.005 to about 0.03 mole per mole of calcium tungstate and Y is from about 0.005 to about 0.03 mole per mole of calcium tungstate and having a Ca:W ratio in said composition of 1 and having essentially all of the calcium and tungsten present as calcium tungstate.

2. A composition according to claim 1 wherein said silicon dioxide is from about 0.005 to about 0.015 moles per mole calcium tungstate.

3. A composition according to claim 2 wherein said lead is from about 0.005 to about 0.025 gram atoms per gram-mole of calcium tungstate.

4. A composition according to claim 3 wherein said composition has an average particle size less than about 4 microns.

5. A composition according to claim 4 wherein said lead is in the +2 valence state.

References Cited
UNITED STATES PATENTS

| | | | |
|---|---|---|---|
| 2,363,090 | 11/1944 | Schoenfeldt | 252—301.5 |
| 3,147,226 | 9/1964 | Jönck | 252—301.4 R |
| 3,368,980 | 2/1968 | Avella et al. | 252—301.4 R |
| 3,502,591 | 3/1970 | Kano et al. | 252—301.4 R |

FOREIGN PATENTS

| | | | |
|---|---|---|---|
| 494,299 | 10/1938 | Great Britain | 252—301.5 |
| 518,646 | 3/1940 | Great Britain | 252—301.5 |

OSCAR R. VERTIZ, Primary Examiner

J. COOPER, Assistant Examiner

PO-1050
(5/69)

UNITED STATES PATENT OFFICE
CERTIFICATE OF CORRECTION

Patent No. 3,790,494                    Dated    February 5, 1974

Inventor(s)    Francis Nathan Shaffer

It is certified that error appears in the above-identified patent
and that said Letters Patent are hereby corrected as shown below:

Address of Inventor - delete "Tonawanda, Pa." and insert --
                      Towanda, Pa. --

Col. 2, line 23 - delete "descriped" and insert -- described --

Col. 2, line 59 - delete "has a modifier" and insert -- has as a
                  modifier --

Col. 4, line 8 - delete "170°F" and insert -- "1700°F --

Col. 4, line 10 - delete "mortaed" and insert -- mortared --

Signed and sealed this 9th day of July 1974.

(SEAL)
Attest:

McCOY M. GIBSON, JR.                        C. MARSHALL DANN
Attesting Officer                           Commissioner of Patents